US009081676B2

(12) United States Patent
Ackaret et al.

(10) Patent No.: US 9,081,676 B2
(45) Date of Patent: Jul. 14, 2015

(54) OPERATING COMPUTER MEMORY

(75) Inventors: Jerry D. Ackaret, Beaverton, OR (US);
Robert M. Dunn, Hyde Park, NY (US);
Anna H. Siskind, Baltimore, MD (US);
Wilson E. Smith, Bahama, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 323 days.

(21) Appl. No.: 12/476,731

(22) Filed: Jun. 2, 2009

(65) Prior Publication Data

US 2010/0306598 A1    Dec. 2, 2010

(51) Int. Cl.
*G06F 11/00*        (2006.01)
*G06F 11/07*        (2006.01)

(52) U.S. Cl.
CPC .......... *G06F 11/0757* (2013.01); *G06F 11/073* (2013.01); *G06F 11/0754* (2013.01); *G06F 11/0793* (2013.01)

(58) Field of Classification Search
CPC .. G06F 11/34; G06F 11/3037; G06F 11/3058
USPC ................................ 714/47.1, 47.2, 47.3, 721
See application file for complete search history.

(56) References Cited

U.S. PATENT DOCUMENTS

| | | | |
|---|---|---|---|
| 5,687,079 A | 11/1997 | Bauer et al. | |
| 6,961,882 B2* | 11/2005 | Manfred et al. | 714/718 |
| 6,977,812 B2* | 12/2005 | Sasaki | 361/679.48 |
| 7,064,994 B1* | 6/2006 | Wu | 365/211 |
| 7,194,645 B2* | 3/2007 | Bieswanger et al. | 713/320 |
| 7,233,538 B1* | 6/2007 | Wu et al. | 365/222 |
| 7,304,905 B2 | 12/2007 | Hsu et al. | |
| 7,346,468 B2 | 3/2008 | Bashor et al. | |
| 7,756,682 B1* | 7/2010 | Pebay et al. | 702/187 |
| 7,765,438 B2* | 7/2010 | Haugh | 714/47.3 |
| 7,774,671 B2* | 8/2010 | Dempsey | 714/745 |
| 7,876,564 B2* | 1/2011 | Monh et al. | 361/700 |
| 2006/0129899 A1* | 6/2006 | Cochran et al. | 714/718 |
| 2006/0280018 A1* | 12/2006 | Cases et al. | 365/226 |
| 2007/0219747 A1* | 9/2007 | Hughes et al. | 702/182 |
| 2008/0109862 A1 | 5/2008 | Jost et al. | |
| 2010/0085196 A1* | 4/2010 | Stiver et al. | 340/584 |

* cited by examiner

*Primary Examiner* — Joshua Lohn
(74) *Attorney, Agent, or Firm* — Edward J. Lenart; Katherine S. Brown; Kennedy Lenart Spraggins LLP

(57) ABSTRACT

Operating computer memory in a computer including dynamically monitoring, by a predictive failure analysis ('PFA') module, correctable memory errors and memory temperature and managing cooling resources in the computer in dependence upon the correctable memory errors and memory temperature.

14 Claims, 6 Drawing Sheets

OPERATING COMPUTER MEMORY

BACKGROUND OF THE INVENTION

1. Field of the Invention

The field of the invention is data processing, or, more specifically, methods, apparatus, and products for operating computer memory.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer technology in which advances have been made is in computer memory. Currently, memory vendors provide a recommended operating temperature range for memory DIMMs (Dual In-line Memory Modules) used in computer systems. Operating computer memory below such recommended operating temperature ensures a low incident rate of soft errors independent of device variability. Cooling computer memory is becoming increasingly difficult in computer systems and servers, such as blade servers for example. This is particularly true when running very heavy workloads such as those encountered in benchmark testing where CPU and memory utilizations are purposely driven to provide maximum performance. Most computer systems today monitor memory temperatures during operation of the computer and increase fan speeds or throttle operation of processors and data communications buses to maintain memory temperatures below the recommended maximum operating values. This prior art method controlling cooling resources in a computer is conservative and often reduces functionality of a computer system unnecessarily. The prior art method uses only temperature in managing cooling of a computer system—completely disregarding any actually occurring memory errors, or the lack thereof at higher temperatures. Further, the recommended operating temperature is also typically set conservatively by the memory vendor. Throttling functionality of a computer to maintain memory temperatures below a conservatively set value further reduces possible functionality of the computer regardless of any actual memory errors. That is, in some instances computer memory may be capable of operating with an acceptable level of memory errors at temperatures well above the maximum recommended operating temperature, but in prior art methods, such operation is prohibited.

SUMMARY OF THE INVENTION

Methods, apparatus, and products for operating computer memory in a computer are described here in which operating computer memory includes dynamically monitoring, by a predictive failure analysis ('PFA') module, correctable memory errors and memory temperature and managing cooling resources in the computer in dependence upon the correctable memory errors and memory temperature.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
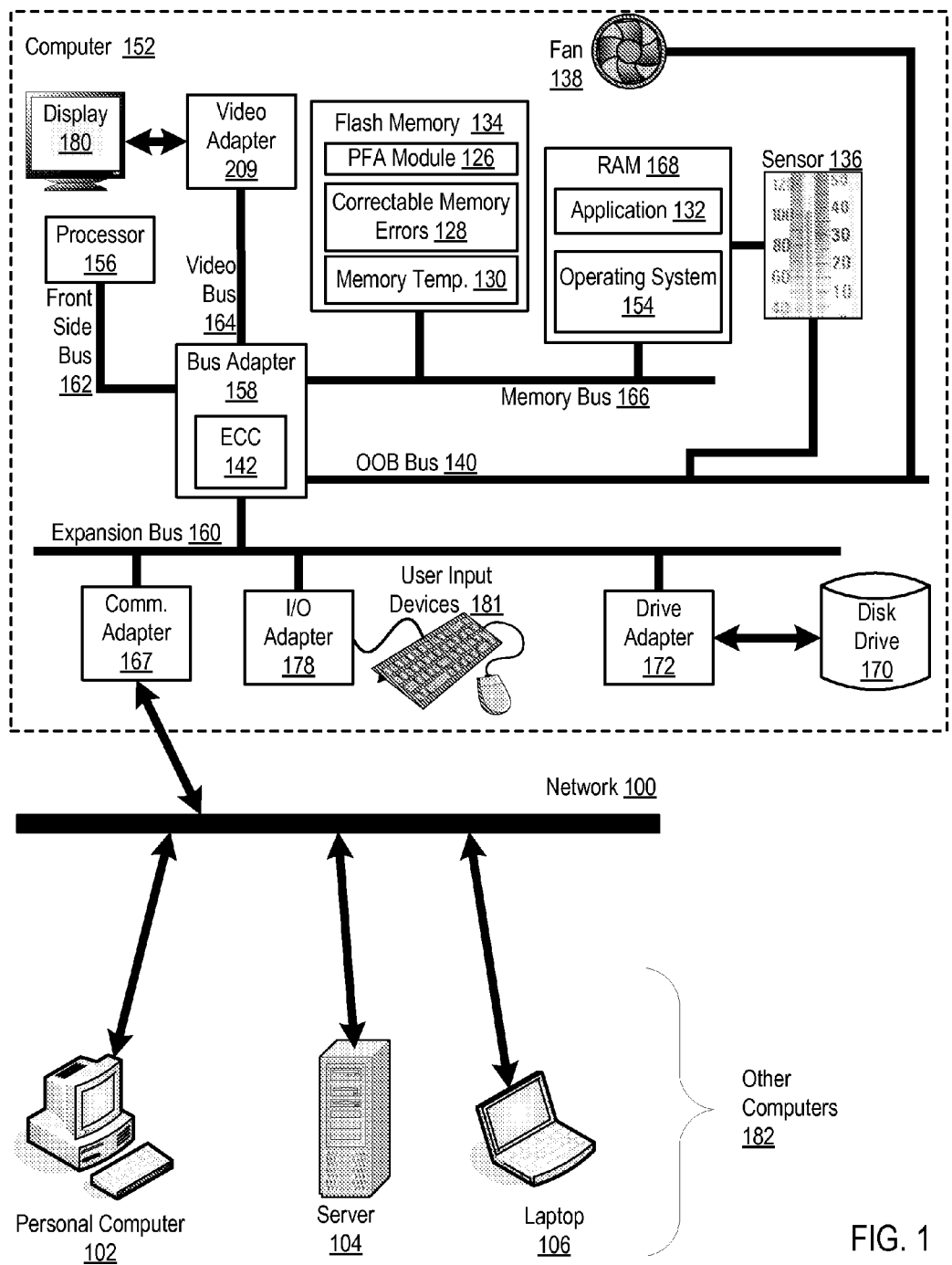
FIG. 1 sets forth a block diagram of a system for operating computer memory according to embodiments of the present invention.

Exemplary methods, apparatus, and products for operating computer memory in accordance with the present invention are described with reference to the accompanying drawings, beginning with FIG. 1. FIG. 1 sets forth a block diagram of a system for operating computer memory according to embodiments of the present invention.

The system of FIG. 1 includes a computer (152) which in turn includes at least one computer processor (156) or 'CPU' as well as computer memory—random access memory (168) ('RAM') which is connected through a high speed memory bus (166) and bus adapter (158) to processor (156) and to other components of the computer (152). Stored in RAM (168) is an application (132), a module of computer program instructions that carry out user level data processing tasks. Examples of such applications (132) include word processors, spreadsheet applications, database applications, media playback applications, and so on as will occur to readers of skill in the art. Also stored in RAM (168) is an operating system (154). Operating systems useful in systems that operate computer memory according to embodiments of the present invention include UNIX™, Linux™, Microsoft XP™, AIX™, IBM's i5/OS™, and others as will occur to those of skill in the art.

From time to time during operation of the computer (152), memory errors may occur that affect data stored in RAM (168), such as the application (132) and operating system (154). Such errors may be caused by many different factors. One factor which may cause an increase in memory errors is a relatively high temperature within the computer (152). Higher temperatures may cause memory errors by imparting additional energy to electrons in memory cells of the computer memory such that the single bit cell changes can occur spontaneously. For this reason, manufacturer's of computer memory typically recommend a maximum operating temperature for the computer memory—a temperature above which operation of the computer memory is not guaranteed to operate properly. The manufacturer's recommended maximum operating temperatures however are often set conservatively. Managing cooling resources in a computer to operate computer memory below such conservatively set maximum operating temperatures reduces a computer's potential processing capabilities because typical methods of cooling a computer memory include reducing operating speeds of processors, voltage levels of processors, and data bus speeds and such methods would be employed whether or not computer memory was actually affected by temperatures above the recommended maximum.

The computer (152) of FIG. 1 also includes Flash memory (134), a type of EEPROM ('Electrically Erasable Programmable Read Only Memory') connected to the processor (156) and other components of the computer (152) through the high speed memory bus (166) and bus adapter (158). Stored in Flash memory (134) is a predictive failure analysis ('PFA') module (134), a module of automated computing machinery that generally operates computer memory in the computer (152) in accordance with embodiments of the present invention. The PFA module (126) may operate computer memory according to embodiments of the present invention by dynamically monitoring correctable memory errors (128) and memory temperature (130) and managing cooling resources in the computer in dependence upon the correctable memory errors (128) and memory temperature (130).

Correctable memory errors are errors in memory in which datum is different from expected but which may be corrected. An example of a correctable memory error is that one bit in a byte is a value other than expected, a bit is a '0' instead of an expected '1.' for example. After identifying a correctable memory error, there is no implication that a system is any less reliable than before the identification of the error.

Memory temperature as the term is used here may refer to any one or combination of parameters, such as, for example, case temperature of the memory itself, internal temperature of one or more memory modules—integrated circuits, chips, and the like, installed on a RAM dual in-line memory module ('DIMM'), ambient air temperature inside the case, and any other temperature as will occur to readers of skill in the art.

The PFA module (126) may monitor correctable memory errors (128) in various ways. One example way in which the PFA module may monitor correctable memory errors is by receiving interrupts upon identification of such errors by an aggregation of computer hardware and software designated for correction of such errors. Such an aggregation of computer hardware, called Error Correction Circuitry ('ECC') (142), identifies memory errors through use of error correction codes as is well known in the art. ECC may, as an alternative to posting interrupt to the PFA module, store a count of memory errors over a predefined period of time, a rate, in a register accessible by the PFA module. In such an embodiment, the PFA module may monitor correctable memory errors by identifying an increase in the count of memory errors in the register. These are but two example ways of monitoring correctable memory errors, described here for purposes of clarity and example, not limitation. Readers of skill in the art will immediately recognize that there are many other possible ways in which a PFA module (126) that operates computer memory in accordance with embodiments of the present invention may monitor correctable memory errors and each such way is well within the scope of the present invention.

The PFA module (126) in the example of FIG. 1 may monitor memory temperature by (130) periodically retrieving the memory temperature, from a memory sensor (136) through the out-of-band bus (140). The memory sensor may be implemented as a digital thermometer or some other sensor from which temperature may be derived as will occur to readers of skill in the art. The out-of-band bus (140) may be any type of bus such as, for example, an Inter-Integrated Circuit ('I²C') bus, a System Management Bus ('SMBus'), a 1-wire bus, a Serial Peripheral Interface ('SPI') bus, Serial Presence Detect ('SPD') bus, System Management Interrupt ('SMI') bus, and so on as will occur to readers of skill in the art.

The PFA module (126) in the example system of FIG. 1 may manage cooling resources in the computer (152) by increasing fan (138) speed through the out-of-band bus (140), by throttling the clock speed of the processor (156), by reducing the operating voltage of the processor (156), by throttling the bus speed of the memory bus (166), by throttling the bus speed of the expansion bus (160), by reducing the bus speed of the front side bus (162), and so on. Cooling resources as the term is used in this specification refers to any device, process, operating parameter, or other configurable element that may be configured to increase cooling in a computer system. Examples of cooling resources include fans (138), bus speeds which may be throttled, processor speeds which may be throttled, operating voltages which may be reduced, and so on as will occur to readers of skill in the art.

Although the PFA module in the example of FIG. 1 is depicted as a single module embodied in flash memory (134), such a PFA module that operates memory according to embodiments of the present invention may be implemented in other forms and in embodied in different mediums. The PFA module may, for example, be stored in Read Only Memory, be a component of firmware such as a Basic Input/Output System ('BIOS') or Extensible Firmware Interface ('EFI'), be stored in ROM of another computer such as a management server connected to the computer (152) through in band or out-of-band communications channels for the purpose of controlling operation of the computer (152), and so on. The computer program instructions of the PFA module may be executed by the processor (156) in the example of FIG. 1 or by another processor, such as a side-band service processor (not shown here). In addition, the operating system (154), application (132), and so on in the example of FIG. 1 are shown in RAM (168) and Flash memory (134), but many components of such software may also be stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for operating computer memory according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for operating computer memory according to embodiments of the present invention include modems for wired dial-up communications, Ethernet (IEEE 802.3) adapters for wired data communications network communications, and 802.11 adapters for wireless data communications network communications.

The computer (152) in the FIG. 1 is only one example of a computer for which computer memory may be operated according to embodiments of the present invention. Such a computer (152) may be a server, a blade server, a thin-client, or other computer configuration as will occur to readers of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
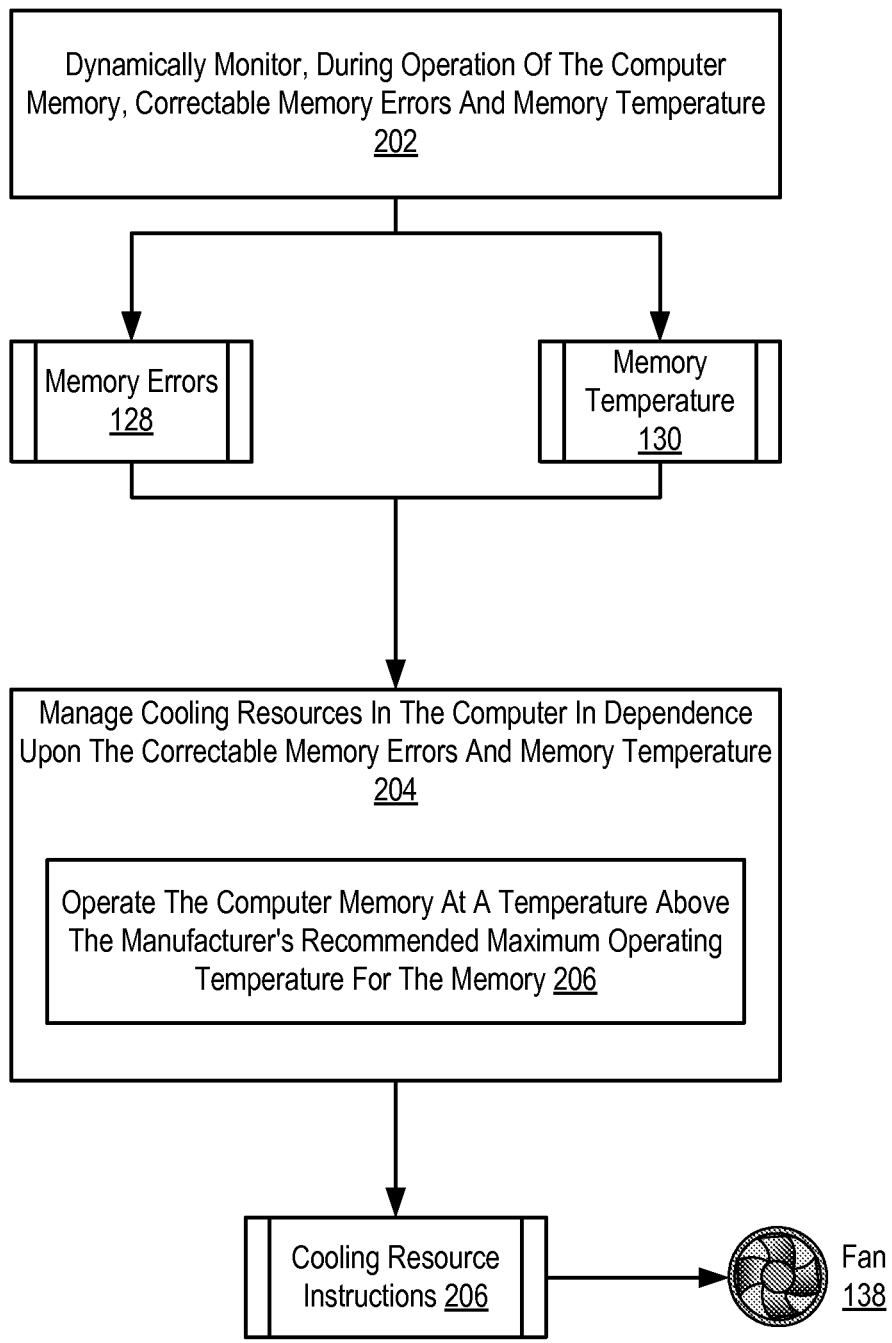
FIG. 2 sets forth a flow chart illustrating an exemplary method for operating computer memory according to embodiments of the present invention.

For further explanation, FIG. 2 sets forth a flow chart illustrating an exemplary method for operating computer memory according to embodiments of the present invention. The method of FIG. 2 is carried out by a PFA module in a computer similar to the PFA module (126) and computer (152) depicted in the exemplary system of FIG. 1.

The method of FIG. 2 includes dynamically monitoring (202), by the PFA module, correctable memory errors (128) and memory temperature (130). The PFA module's 'monitoring' is described here as being carried out dynamically in that such monitoring is carried out during operation of the computer memory. As mentioned above, monitoring (202) correctable memory errors (128) may be carried out by through use of error correction codes and error correction circuitry and monitoring (202) memory temperature (130) may be carried out by periodically retrieving such memory temperature from a sensor (136 on FIG. 1) dedicated for such a purpose.

The method of FIG. 2 also includes managing (204) cooling resources in the computer in dependence upon the correctable memory errors (128) and memory temperature (130). Managing (204) cooling resources in the computer may be carried out in various ways including, for example, by reducing the clock speed of the memory bus, reducing the clock speed of a computer processor, reducing operating voltage of the computer processor, increasing fan (138) speed, and so on as will occur to readers of skill in the art.

In the method of FIG. 2, managing (204) cooling resources in the computer includes operating (206) the computer memory at a temperature above the manufacturer's recommended maximum operating temperature for the memory. Operating (206) the computer memory at a temperature above the manufacturer's recommended maximum operating temperature for the memory may be carried out by not immediately reporting a temperature above the recommended maximum operating temperature for the memory, by not disabling the memory immediately upon reaching such a maximum operating temperature, and so as will occur to readers of skill in the art. In prior art systems, when computer memory reached a temperature at or above the recommended maximum operating temperature, cooling was automatically increased typically by throttling the computer memory, computer memory bus, and processor speed. Here, by contrast, the computer memory operates above the maximum operating temperature without increasing such cooling until correctable memory errors indicate an actual affect on the computer memory by the current memory temperature. Further, cooling resources in computer systems of the prior art were controlled on temperature alone, not temperature and memory errors.

Figure 3:
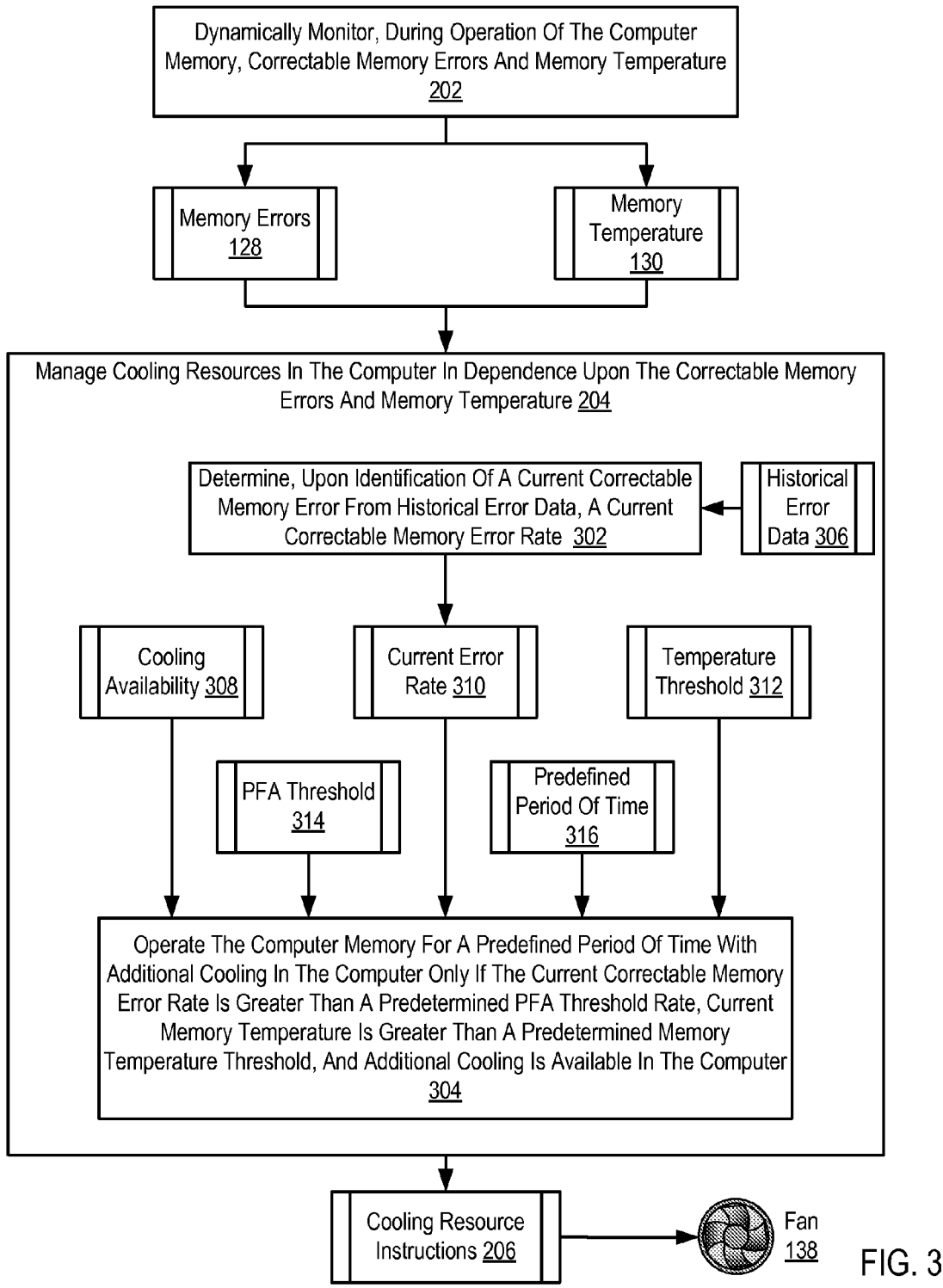
FIG. 3 sets forth a flow chart illustrating a further exemplary method for operating computer memory according to embodiments of the present invention.

For further explanation, FIG. 3 sets forth a flow chart illustrating a further exemplary method for operating computer memory according to embodiments of the present invention. The method of FIG. 3 is similar to the method of FIG. 2 in that the method of FIG. 3 is carried out by a PFA module in a computer similar to the PFA module (126) and computer (152) depicted in the exemplary system of FIG. 1. The method of FIG. 3 is also similar to the method of FIG. 2 in that the method of FIG. 3 includes dynamically monitoring (202), by a predictive failure analysis ('PFA') module, correctable memory errors (128) and memory temperature (130) and managing (204) cooling resources in the computer in dependence upon the correctable memory errors (128) and memory temperature (130).

The method of FIG. 3 differs from the method of FIG. 2, however, in that in the method of FIG. 3 managing (204) cooling resources in the computer in dependence upon the correctable memory errors (128) and memory temperature (130) includes determining (302), upon identification of a current correctable memory error (128) from historical error data (304), a current correctable memory error rate (310) and operating (304) the computer memory for a predefined period of time (316) with additional cooling in the computer only if the current correctable memory error rate (310) is greater than a predetermined PFA threshold rate (314), current memory temperature (130) is greater than a predetermined memory temperature threshold (312), and additional cooling is available in the computer.

Historical error data (304) as the term is used here refers to data from which a rate of correctable memory errors may be calculated. Such data may be a count of errors over a predefined period of time. As described above Error Correction Circuitry may store a count of such memory errors over a predefined time in a designated register. The ECC may, for example, store such a count of errors every 10 milliseconds (ms). In such an example the ECC maintains an error count for 10 (ms) at the end of which the ECC sets the error count to zero and begins counting errors again for another 10 ms and so on. In this way, the count in the register represents the numerator of a correctable memory error rate. In this example embodiment, determining (302) a current correctable memory error rate (310) may be carried out by retrieving the count from the register of the ECC. As an alternative to a count of memory errors over a predefined time, the historical error data may be a set of timestamps, stored by the ECC, indicating occurrences of memory errors. In this example embodiment, determining (302) a current correctable memory error rate (310) may be carried out by counting the number of timestamps having a time of a memory error within a predefined period of time. In this example embodiment, a the PFA module determines a current correctable memory error rate using a 'rolling window' of time.

Figure 4:
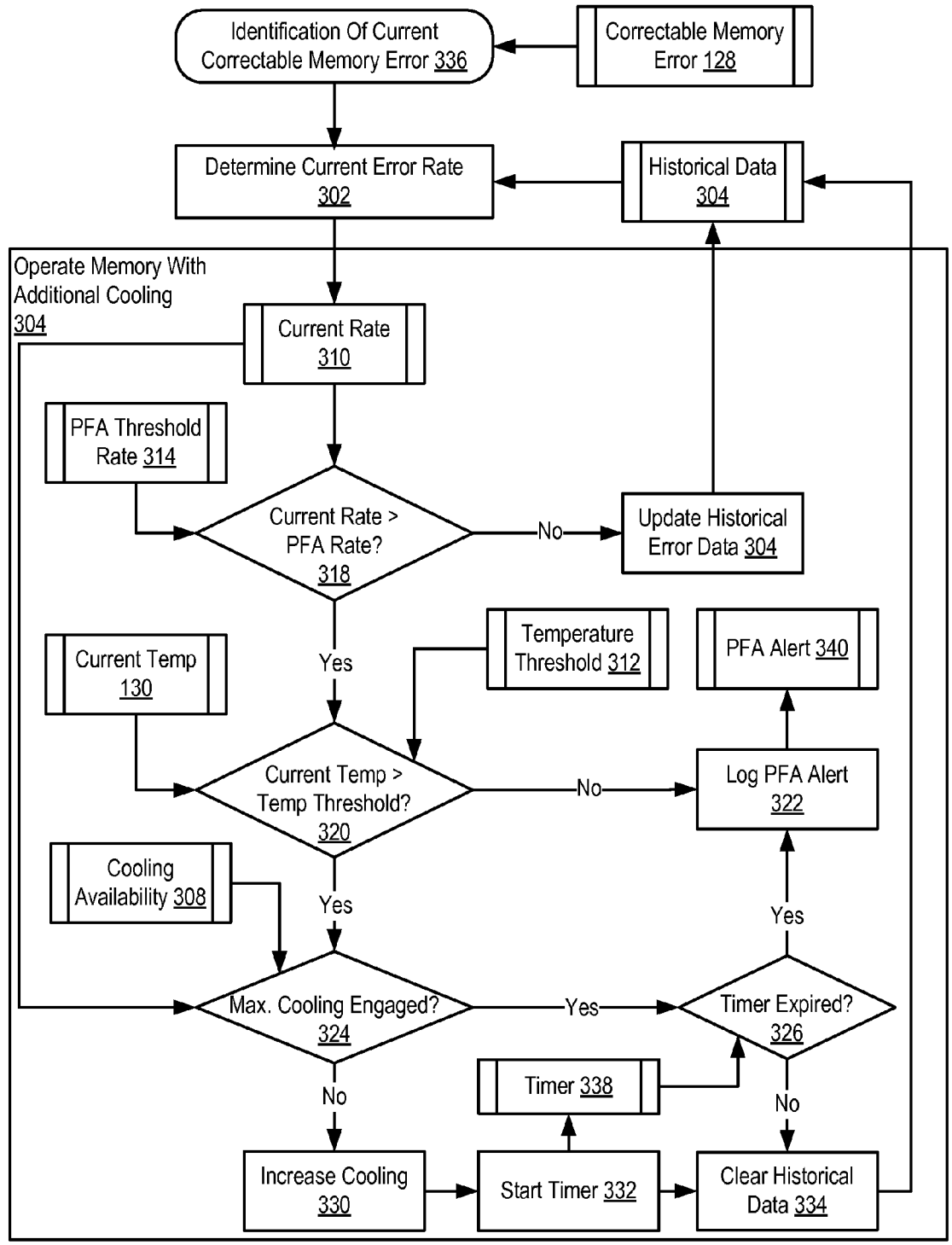
FIG. 4 sets forth a flow chart illustrating an exemplary method for managing cooling resources in the computer in dependence upon the correctable memory errors and memory temperature according to embodiments of the present invention.

Operating (304) the computer memory for a predefined period of time (316) with additional cooling in the computer only if the current correctable memory error rate (310) is greater than a predetermined PFA threshold rate (314), current memory temperature (130) is greater than a predetermined memory temperature threshold (312), and additional cooling is available in the computer is described in FIG. 4.

For further explanation, therefore, FIG. 4 sets forth a flow chart illustrating an exemplary method for managing (204) cooling resources in the computer in dependence upon the correctable memory errors (128) and memory temperature (130) according to embodiments of the present invention. The method of FIG. 4, like the method of FIG. 3, includes determining (302), upon identification (336) of a current correctable memory error (128) from historical error data (304), a current correctable memory error rate (310) which is carried out as described above with respect to FIG. 3.

In the method of FIG. 4 operating (304) the computer memory for a predefined period of time (316) with additional cooling according to embodiments of the present invention includes determining (318) whether the current correctable memory error rate (310) exceeds a PFA threshold rate (314). A PFA threshold rate is a threshold rate of memory error occurrences which may be set by a manufacturer, by a user, by a system administrator, and so on. The PFA threshold rate used in determining (318) whether the current correctable memory error rate (310) exceeds a PFA threshold rate (314), in some example embodiments, is the numerator of a fraction—a threshold number of errors—while the current correctable memory error rate (310) is also expressed as a numerator of fraction—the present count of errors in an ECC register as described above. Determining whether to determining (318) whether the current correctable memory error rate (310) exceeds a PFA threshold rate (314) then may be carried out by comparing the two counts—the PFA threshold count and the current count of memory errors in the ECC register.

If the current correctable memory error rate (310) does not exceed the PFA threshold rate (314), the method of FIG. 4 continues by updating (304) the historical error data (304) in accordance with the identified current correctable memory error (128). Updating (304) the historical error data (304) in accordance with the identified current correctable memory error (128) may be carried out by incrementing the count in the ECC register. The ECC in some embodiments does not increment the count itself upon an occurrence of a memory error but rather only reports the occurrence to the PFA module. In such an embodiment the PFA module may increment that count here, when the current rate (310) is not greater than the PFA threshold rate (314).

If the current correctable memory error rate (310) exceeds the PFA threshold rate (314), however, the method of FIG. 4 continues by determining (320) whether the current memory temperature (130) exceeds a predetermined temperature threshold (312). The predetermined temperature threshold in some embodiments is the manufacturer's recommended maximum operating temperature for the computer memory.

If the current memory temperature (130) does not exceed the predetermined temperature threshold (312), the method of FIG. 4 continues by logging (322) a PFA alert (340). A PFA alert as the term is used here is an indication of memory degradation sometimes necessitating replacement of the memory. Logging (322) such a PFA alert (340) may be carried out in various ways including, for example, by storing the alert as data in a log file, by sending a notification to a user through a user-level application, by posting an interrupt in a service processor, and in other ways as will occur to readers of skill in the art.

If the current memory temperature (130) exceeds the predetermined temperature threshold (312), the method of FIG. 4 continues by determining (324) whether maximum cooling is engaged. Maximum cooling as the term is used here describes a state of cooling resources in the computer in which cooling cannot be increased. Such a state may occur, for example, when a processor is throttled to its lowest possible operating speed, computer fan speed is set at its maximum possible speed, all bus speeds are reduced as much as possible, and so on.

If maximum cooling is not engaged, the method of FIG. 4 continues by increasing (330) cooling in the computer and starting (332) a predefined cooling countdown timer (338). The predefined cooling countdown timer is a module of automated computing machinery which counts down time from a starting time to zero, say 20 seconds to zero seconds or 100 clock cycles to zero clock cycles, for example. The timer is 'predefined' in that the starting time of the timer may be set by a user.

After starting (332) the countdown timer (338), the method of FIG. 4 continues by clearing historical data, that is setting a count of memory errors to zero. Setting the memory error count to zero provides additional time for cooling in the computer to lower memory temperature because the current rate (310) has been reduced to zero and will not be greater than the PFA threshold (314) until other errors occur causing the method of FIG. 4 to run through several iterations of step (302) and step (304) prior to taking further action such as logging a PFA alert. That is, upon clearing historical data (334) the method of FIG. 4 is effectively reset.

If maximum cooling is engaged, the method of FIG. 4 continues by determining (326) whether a previously started cooling countdown timer (338) has expired. Determining (326) whether a previously started cooling countdown timer (338) has expired may be carried out reading the present value of the timer and if the value is zero, the previously started timer has expired. If the previously started predefined cooling countdown timer has expired, the method of FIG. 4 continues by logging (322) a PFA alert (340);

If the previously started predefined cooling countdown timer has not expired, the method of FIG. 4 continues by clearing (334) the historical error data. Again, as mentioned above, clearing the historical data provides additional time for the increased cooling to reduce memory temperature within the computer prior to logging a PFA event.

Figure 5:
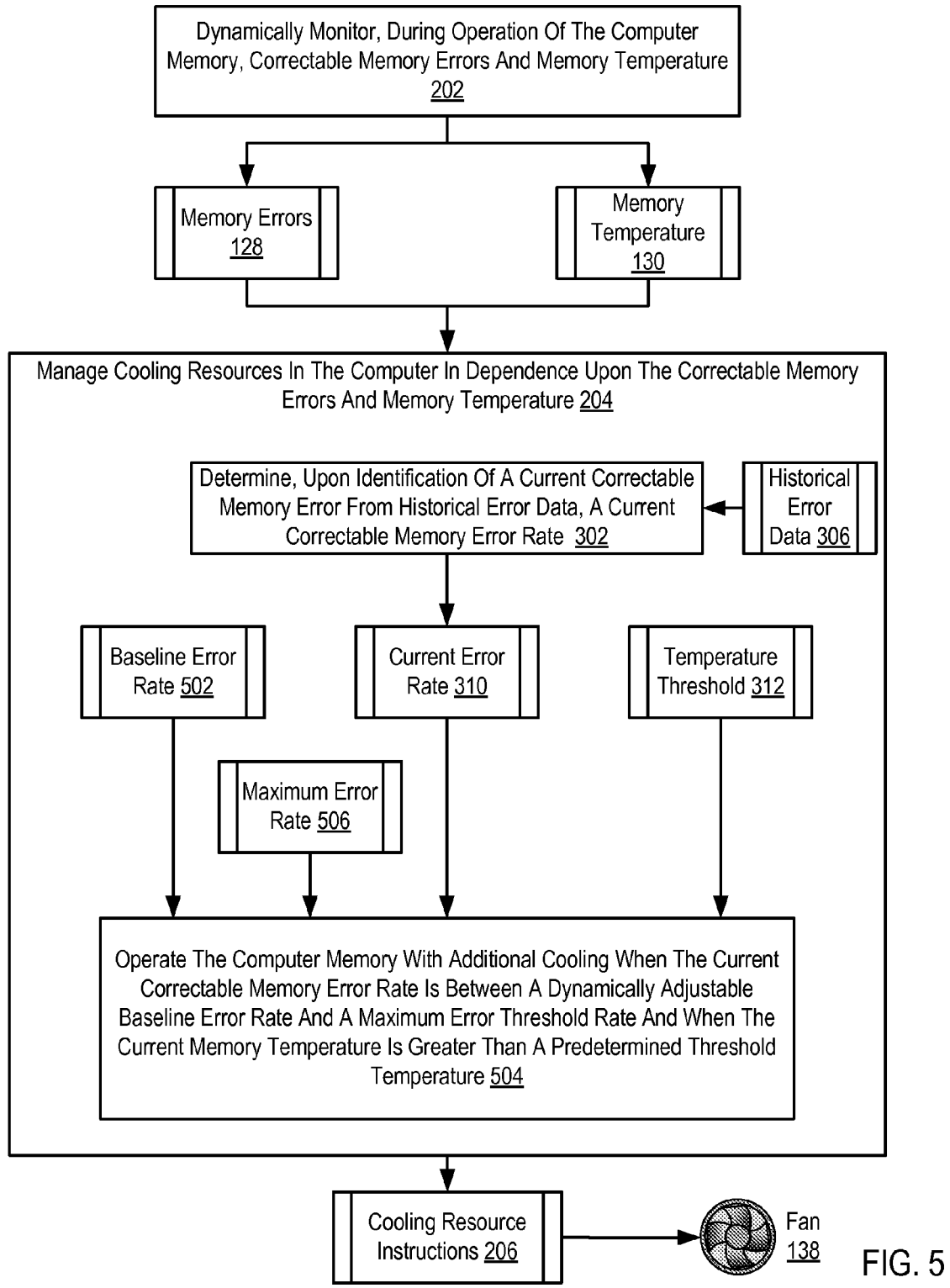
FIG. 5 sets forth a flow chart illustrating a further exemplary method for operating computer memory according to embodiments of the present invention.

For further explanation, FIG. 5 sets forth a flow chart illustrating a further exemplary method for operating computer memory according to embodiments of the present invention. The method of FIG. 5 is similar to the method of FIG. 2 in that the method of FIG. 5 is carried out by a PFA module in a computer similar to the PFA module (126) and computer (152) depicted in the exemplary system of FIG. 1. The method of FIG. 5 is also similar to the method of FIG. 2 in that the method of FIG. 5 includes dynamically monitoring (202), by a predictive failure analysis ('PFA') module, correctable memory errors (128) and memory temperature (130) and managing (204) cooling resources in the computer in dependence upon the correctable memory errors (128) and memory temperature (130).

The method of FIG. 5 differs from the method of FIG. 2, however, in that in the method of FIG. 5, managing (204) cooling resources in the computer is carried out by determining (302), upon identification of a current correctable memory error (128) from historical error data (306), a current correctable memory error rate (310) and operating (504) the computer memory with additional cooling when the current correctable memory error rate (310) is between a dynamically adjustable baseline error rate (502) and a maximum error threshold rate (506) and when the current memory temperature (130) is greater than a predetermined threshold temperature (312). Determining (302), upon identification of a current correctable memory error (128) from historical error data (306), a current correctable memory error rate (310) may be carried out as described above and operating (504) the computer memory with additional cooling when the current correctable memory error rate (310) is between a dynamically adjustable baseline error rate (502) and a maximum error threshold rate (506) and when the current memory temperature (130) is greater than a predetermined threshold temperature (312) is described in detail below with respect to FIG. 6.

Figure 6:
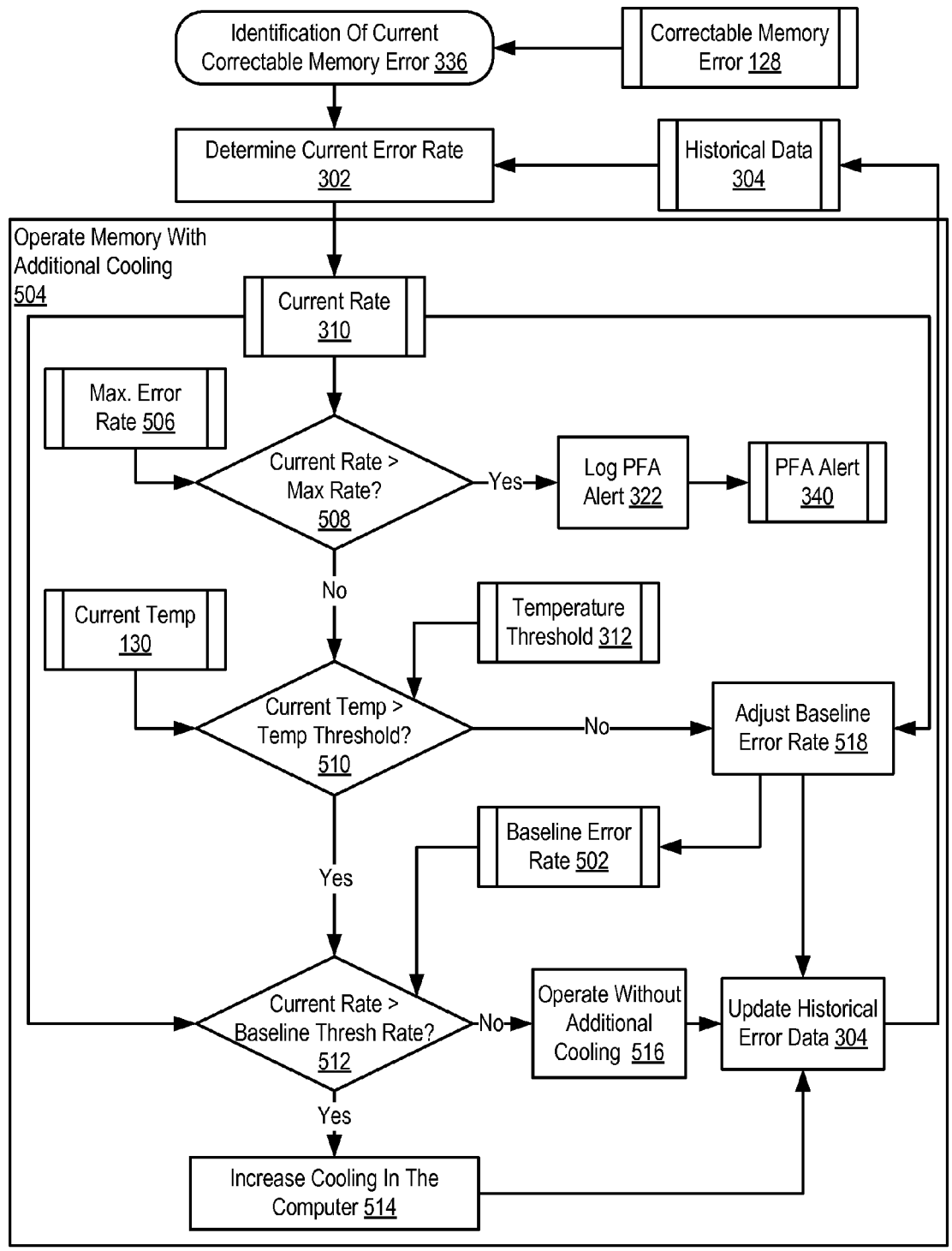
FIG. 6 sets forth a flow chart illustrating a further exemplary method for managing cooling resources in the computer in dependence upon the correctable memory errors and memory temperature according to embodiments of the present invention.

For further explanation, therefore, FIG. 6 sets forth a flow chart illustrating an exemplary method for managing (204) cooling resources in the computer in dependence upon the correctable memory errors (128) and memory temperature (130) according to embodiments of the present invention. The method of FIG. 6, like the method of FIG. 5, includes determining (302), upon identification (336) of a current correctable memory error (128) from historical error data (304), a current correctable memory error rate (310) which is carried out as described above with respect to FIG. 3.

In the method of FIG. 6, operating (504) the computer memory with additional cooling when the current correctable memory error rate (310) is between a dynamically adjustable baseline error rate (502) and a maximum error threshold rate (506) and when the current memory temperature (130) is greater than a predetermined threshold temperature (312) includes determining (508) whether the current correctable memory error rate (310) is greater than the maximum error threshold rate (506). A maximum error threshold rate (506) is an upper threshold value where a memory error rate above that threshold value indicates memory failure.

If the current correctable memory error rate (310) is greater than the maximum error threshold rate (506), the method of FIG. 6 continues by logging (322) a PFA alert (340) which is carried out as described above. If the current correctable memory error rate (310) is not greater than the maximum error threshold rate (506), the method of FIG. 6 continues by determining (510) whether the current memory temperature (130) is greater than the predetermined threshold temperature (312).

If the current memory temperature (130) is not greater than the predetermined threshold temperature (312), dynamically adjusting (518) the baseline error rate (502) in dependence upon the current correctable memory error rate (310). The baseline error rate represents an acceptable rate of errors with which the computer memory may operate normally, without additional cooling. Adjusting (518) the baseline error rate (502) in dependence upon the current correctable memory error rate (310) may be carried out by incrementing the numerator of the rate by summing the numerator of the current correctable memory error rate (310) with a predefined guardband. A predefined guardband is a value when added as part of the baseline threshold rate (302) provides an increased number of memory errors, and thereby time, with which the computer memory may operate without additional cooling. In some embodiments the baseline threshold rate, once increased, must remain less than the maximum threshold rate. Consider for example, that the current correctable memory rate is 10, the baseline error rate (502) was 9, prior to adjustment (518), and the value of the predefined guardband is 3. Adjusting (518) the baseline error rate (502) may be carried out by summing the current rate of 10 with the guardband of 3, an adjusted baseline error rate of 13.

If the current memory temperature (130) is greater than the predetermined threshold temperature (312), the method of FIG. 6 continues by determining (512) whether the current correct memory error rate (310) is greater than the baseline error rate (502). If the current correctable memory error rate (310) is not greater than the baseline error rate (502), the method of FIG. 6 continues by operating (516) the computer memory without increasing cooling and by updating (304) the historical error data in accordance with the identified current correctable memory error (128). If the current correctable memory error rate (310) is greater than the baseline error rate (502), the method of FIG. 6 includes increasing (514) cooling in the computer and updating (304) the historical error data in accordance with the identified current correctable memory error (128).

Exemplary embodiments of the present invention are described largely in the context of a fully functional computer system for operating computer memory. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating computer memory in a computer, the method comprising:
   dynamically monitoring, by a predictive failure analysis ('PFA') module, correctable memory errors and memory temperature; and
   managing cooling resources in the computer in dependence upon the correctable memory errors and memory temperature, wherein managing cooling resources includes controlling a fan speed; including:
      determining, upon identification of a current correctable memory error from historical error data, a current correctable memory error rate; and
      operating the computer memory with additional cooling when the current correctable memory error rate is between a dynamically adjustable baseline error rate and a maximum error threshold rate and when the current memory temperature is greater than a predetermined threshold temperature, including:
         determining whether the current correctable memory error rate is greater than the maximum error threshold rate;
         if the current correctable memory error rate is greater than the maximum error threshold rate, logging a PFA alert;
         if the current correctable memory error rate is not greater than the maximum error threshold rate, determining whether the current memory temperature is greater than the predetermined threshold temperature,
         if the current memory temperature is greater than the predetermined threshold temperature, determining whether the current correct memory error rate is greater than the baseline error rate;
         if the current correctable memory error rate is greater than the baseline error rate, increasing cooling in the computer and updating the historical error data in accordance with the identified current correctable memory error; and
         if the current correctable memory error rate is not greater than the baseline error rate, operating the computer memory without increasing cooling and updating the historical error data in accordance with the identified current correctable memory error.

2. The method of claim 1 wherein managing cooling resources further comprises:
   operating the computer memory at a temperature above the manufacturer's recommended maximum operating temperature for the memory.

3. The method of claim 1 wherein managing cooling resources further comprises:
   determining, upon identification of a current correctable memory error from historical error data, a current correctable memory error rate; and
   operating the computer memory for a predefined period of time with additional cooling in the computer only if the current correctable memory error rate is greater than a predetermined PFA threshold rate, current memory temperature is greater than a predetermined memory temperature threshold, and additional cooling is available in the computer.

4. The method of claim 3 wherein operating the computer memory for a predefined period of time with additional cooling in the computer further comprises:
   determining whether the current correctable memory error rate exceeds a PFA threshold rate;
   if the current correctable memory error rate does not exceed the PFA threshold rate, updating the historical error data in accordance with the identified current correctable memory error; and
   if the current correctable memory error rate exceeds the PFA threshold rate, determining whether the current memory temperature exceeds a predetermined temperature threshold;
   if the current memory temperature does not exceed the predetermined temperature threshold, logging a PFA alert;
   if the current memory temperature exceeds the predetermined temperature threshold, determining whether maximum cooling is engaged;
   if maximum cooling is not engaged, increasing cooling in the computer and starting a predefined cooling countdown timer;
   if maximum cooling is engaged, determining whether a previously started cooling countdown timer has expired;
   if the previously started predefined cooling countdown timer has expired, logging a PFA alert; and
   if the previously started predefined cooling countdown timer has not expired, clearing the historical error data.

5. The method of claim 1 further comprising:
   if the current memory temperature is not greater than the predetermined threshold temperature, dynamically adjusting the baseline error rate in dependence upon the current correctable memory error rate.

6. An apparatus for operating computer memory, the apparatus comprising a computer processor, the computer memory operatively coupled to the computer processor, the computer memory having disposed within it computer program instructions capable of:
   dynamically monitoring, by a predictive failure analysis ('PFA') module, correctable memory errors and memory temperature; and
   managing cooling resources in the computer in dependence upon the correctable memory errors and memory temperature, wherein managing cooling resources includes controlling a fan speed, including:
      determining, upon identification of a current correctable memory error from historical error data, a current correctable memory error rate; and
      operating the computer memory with additional cooling when the current correctable memory error rate is between a dynamically adjustable baseline error rate and a maximum error threshold rate and when the current memory temperature is greater than a predetermined threshold temperature, including:
         determining whether the current correctable memory error rate is greater than the maximum error threshold rate;
         if the current correctable memory error rate is greater than the maximum error threshold rate, logging a PFA alert;
         if the current correctable memory error rate is not greater than the maximum error threshold rate, determining whether the current memory temperature is greater than the predetermined threshold temperature,
         if the current memory temperature is greater than the predetermined threshold temperature, determining whether the current correct memory error rate is greater than the baseline error rate;

if the current correctable memory error rate is greater than the baseline error rate, increasing cooling in the computer and updating the historical error data in accordance with the identified current correctable memory error; and if the current correctable memory error rate is not greater than the baseline error rate, operating the computer memory without increasing cooling and updating the historical error data in accordance with the identified current correctable memory error.

7. The apparatus of claim 6 wherein managing cooling resources further comprises:

operating the computer memory at a temperature above the manufacturer's recommended maximum operating temperature for the memory.

8. The apparatus of claim 6 wherein managing cooling resources further comprises:

determining, upon identification of a current correctable memory error from historical error data, a current correctable memory error rate; and operating the computer memory for a predefined period of time with additional cooling in the computer only if the current correctable memory error rate is greater than a predetermined PFA threshold rate, current memory temperature is greater than a predetermined memory temperature threshold, and additional cooling is available in the computer.

9. The apparatus of claim 8 wherein operating the computer memory for a predefined period of time with additional cooling in the computer further comprises:

determining whether the current correctable memory error rate exceeds a PFA threshold rate;

if the current correctable memory error rate does not exceed the PFA threshold rate, updating the historical error data in accordance with the identified current correctable memory error; and if the current correctable memory error rate exceeds the PFA threshold rate, determining whether the current memory temperature exceeds a predetermined temperature threshold;

if the current memory temperature does not exceed the predetermined temperature threshold, logging a PFA alert;

if the current memory temperature exceeds the predetermined temperature threshold, determining whether maximum cooling is engaged;

if maximum cooling is not engaged, increasing cooling in the computer and starting a predefined cooling countdown timer;

if maximum cooling is engaged, determining whether a previously started cooling countdown timer has expired;

if the previously started predefined cooling countdown timer has expired, logging a PFA alert; and if the previously started predefined cooling countdown timer has not expired, clearing the historical error data.

10. The apparatus of claim 6 further comprising computer program instructions capable of:

if the current memory temperature is not greater than the predetermined threshold temperature, dynamically adjusting the baseline error rate in dependence upon the current correctable memory error rate.

11. A computer program product for operating computer memory, the computer program product disposed in a computer readable recording medium, the computer program product comprising computer program instructions capable of:

dynamically monitoring, by a predictive failure analysis ('PFA') module, correctable memory errors and memory temperature; and managing cooling resources in the computer in dependence upon the correctable memory errors and memory temperature, wherein managing cooling resources includes controlling a fan speed, including:

determining, upon identification of a current correctable memory error from historical error data, a current correctable memory error rate; and operating the computer memory with additional cooling when the current correctable memory error rate is between a dynamically adjustable baseline error rate and a maximum error threshold rate and when the current memory temperature is greater than a predetermined threshold temperature, including:

determining whether the current correctable memory error rate is greater than the maximum error threshold rate;

if the current correctable memory error rate is greater than the maximum error threshold rate, logging a PFA alert;

if the current correctable memory error rate is not greater than the maximum error threshold rate, determining whether the current memory temperature is greater than the predetermined threshold temperature, if the current memory temperature is not greater than the predetermined threshold temperature, dynamically adjusting the baseline error rate in dependence upon the current correctable memory error rate;

if the current memory temperature is greater than the predetermined threshold temperature, determining whether the current correct memory error rate is greater than the baseline error rate;

if the current correctable memory error rate is greater than the baseline error rate, increasing cooling in the computer and updating the historical error data in accordance with the identified current correctable memory error; and if the current correctable memory error rate is not greater than the baseline error rate, operating the computer memory without increasing cooling and updating the historical error data in accordance with the identified current correctable memory error.

12. The computer program product of claim 11 wherein managing cooling resources further comprises:

operating the computer memory at a temperature above the manufacturer's recommended maximum operating temperature for the memory.

13. The computer program product of claim 11 wherein managing cooling resources further comprises:

determining, upon identification of a current correctable memory error from historical error data, a current correctable memory error rate; and operating the computer memory for a predefined period of time with additional cooling in the computer only if the current correctable memory error rate is greater than a predetermined PFA threshold rate, current memory temperature is greater than a predetermined memory temperature threshold, and additional cooling is available in the computer.

14. The computer program product of claim 13 wherein operating the computer memory for a predefined period of time with additional cooling in the computer further comprises:
- determining whether the current correctable memory error rate exceeds a PFA threshold rate;
- if the current correctable memory error rate does not exceed the PFA threshold rate, updating the historical error data in accordance with the identified current correctable memory error; and
- if the current correctable memory error rate exceeds the PFA threshold rate, determining whether the current memory temperature exceeds a predetermined temperature threshold;
- if the current memory temperature does not exceed the predetermined temperature threshold, logging a PFA alert;
- if the current memory temperature exceeds the predetermined temperature threshold, determining whether maximum cooling is engaged;
- if maximum cooling is not engaged, increasing cooling in the computer and starting a predefined cooling countdown timer;
- if maximum cooling is engaged, determining whether a previously started cooling countdown timer has expired;
- if the previously started predefined cooling countdown timer has expired, logging a PFA alert; and
- if the previously started predefined cooling countdown timer has not expired, clearing the historical error data.

\* \* \* \* \*